United States Patent [19]

Hwang et al.

[11] Patent Number: 5,488,421
[45] Date of Patent: Jan. 30, 1996

[54] INTERLACED-TO-PROGRESSIVE SCANNING CONVERTER WITH A DOUBLE-SMOOTHER AND A METHOD THEREFOR

[75] Inventors: Humor Hwang; Myeong-hwan Lee, both of Kyungki, Rep. of Korea

[73] Assignee: Samsung Electronics Co., Ltd., Kyungki, Rep. of Korea

[21] Appl. No.: 253,856

[22] Filed: Jun. 3, 1994

[30] Foreign Application Priority Data

Jun. 5, 1993 [KR] Rep. of Korea .................. 1993-10176

[51] Int. Cl.⁶ .................................................. H04N 7/01
[52] U.S. Cl. ............................................ 348/448; 348/607
[58] Field of Search ........................... 348/448–452, 348/458, 607; H04N 7/01

[56] References Cited

U.S. PATENT DOCUMENTS

| | | | |
|---|---|---|---|
| 4,682,230 | 7/1987 | Perlman et al. | 358/167 |
| 5,049,993 | 9/1991 | LeGall et al. | 348/448 |
| 5,175,619 | 12/1992 | Willis | 348/448 |

OTHER PUBLICATIONS

"Interlaced to Progressive Conversion by Median Filtering", Capodiferro, Third International Workshop on HDTV, vol. III, Aug. 30–Sep. 1, 1989, Torino, Italy.

"A Generalization of Median Filtering Using Linear Combinations of Order Statistics", Bovik et al., IEEE Transactions on Acoustics, Speech, & Signal Processing, vol. ASSP-31, No. 6, Dec. 1983, pp. 1342–1349.

"Applications of Nonlinear Smoothing Algorithm to Speech Processing", Rabiner et al., IEEE Transactions on Acoustics, Speech, & Signal Processing, vol. ASSP-23, No. 6, Dec. 1975, pp. 552–557.

*Primary Examiner*—Victor R. Kostak
*Attorney, Agent, or Firm*—Sughrue, Mion, Zinn, Macpeak & Seas

[57] ABSTRACT

An interlaced-to-progressive scanning converting apparatus for double-smoothing which prevents picture deterioration wherein the scanning method for a television signal is converted from an interlaced scanning method into a progressive scanning method, and a method therefor. The apparatus includes a double-smoothing circuit including a median-filter for median-filtering an interlaced scanning signal, a censoring circuit for censoring the median-filtered signal according to predetermined bias values, an order statistics filter (OSF) for setting a predetermined weighing coefficient according to the censored signal. The apparatus further includes an interlaced-to-progressive converter for converting the double-smoothed interlaced scanning signal into a progressive scanning signal. The apparatus and corresponding method, thus, prevent picture deterioration phenomena such as inter-line flickering, line crawling or stepped-shaped edges.

32 Claims, 4 Drawing Sheets

INTERLACED-TO-PROGRESSIVE SCANNING CONVERTER WITH A DOUBLE-SMOOTHER AND A METHOD THEREFOR

BACKGROUND OF THE INVENTION

The present invention relates to a scanning converter for converting the scanning method for a television signal from an interlaced scanning method, where adjacent lines are formed in different scanning passes, into a progressive scanning method where adjacent lines are sequentially formed in the same scan pass, and to a method therefor. More particularly, the present invention relates to an interlaced-to-progressive scanning converter and method which prevents picture quality deterioration by employing a double-smoother using median-filtering, which reduces the distortion effects associated with eliminating noise.

In general, in an image signal processor such as is used in televisions, facsimiles or medical appliances, an image signal based on an interlaced scanning method is converted into a progressive scanning signal to improve the picture quality which is somewhat distorted by the use of interlaced scanning. In the case of a television signal, the interlaced scanning method provides for effective utilization of transmission bands and takes advantage of the physical properties of a television receiver. However, the interlaced scanning method produces deterioration phenomena such as inter-line flickering or line crawling. Moreover, with large high-quality television screens, scanning lines can be seen on a screen along with such deterioration phenomena.

In order to alleviate the deterioration of the picture quality due to the interlaced scanning method as described above, the television signal scanning method is converted into a progressive scanning method.

Previously, interlaced-to-progressive scanning converters processed a signal on horizontal and vertical space planes. However, due to the recent quest for a high quality television picture and the reduction of memory cost in connection therewith, motion-adaptive signal processing has been employed for high picture quality televisions.

Figure 1:
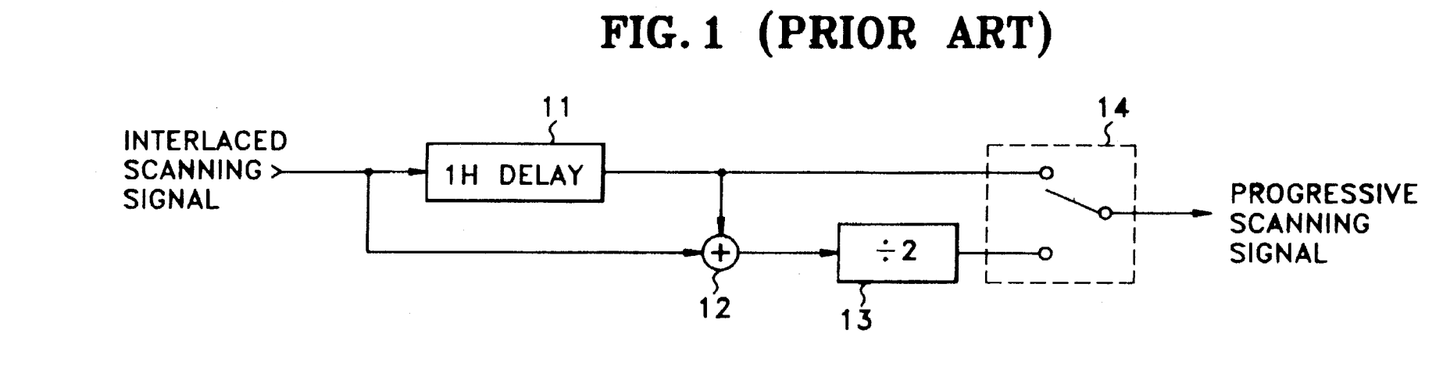
FIG. 1 is a block diagram of a conventional interlaced-to-progressive scanning converting apparatus.

FIG. 1 shows an example of an interlaced-to-progressive converter which performs the conversion by linear interpolation using a vertical median, or in other words, the median value of pixels aligned vertically but in different lines of the picture. The converter delays the interlaced scanning signal by a 1H delay element 11 and applies the delayed signal to a first input terminal of a selector 14. Here, an adder 12 adds the input interlaced scanning signal to the 1H delayed signal and applies the resultant signal to a second input terminal of the selector 14 through a divide-by-two circuit 13 thus, producing a pixel which is the median value between the interlaced scanning signal and the 1H delayed signal. Then, selector 14 alternately selects the 1H delayed signal and the divide-by-two median signal at a rate twice the interlaced scanning rate, to thereby output a progressive scanning signal. However, the interlaced-to-progressive scanning converter shown in FIG. 1 may cause the displayed image to be blurry.

Also, an interlaced-to-progressive scanning converter which performs a conversion by three-dimensional interpolation using motion-adaptive signal processing, improves the resolution of motionless areas of an image but cannot prevent the phenomenon of picture contour deterioration in which contours contained in a picture appear as step-shaped edges. To avoid this problem, a separate motion detector must be used, however, the associated hardware becomes complex due to the necessity for using a field memory which stores an entire field, or in other words, one pass of an interlace scan, resulting in increased cost.

Furthermore, in the case of a transmitted image signal or a signal reproduced from a recorded image signal, picture quality is also deteriorated due to the mixing of impulse noise or Gaussian noise with the signal within a given channel. Impulse noise within a picture signal may be generated, for example, by a low signal-to-noise ratio of an FM satellite broadcast signal, or by electromagnetic interference in the television receiver. In this case, when performing motion-adaptive signal processing using motion detection, the picture which includes a noise signal may cause a malfunction during detection. This is because an analog correlation, which can be indicated by the difference in levels between a current frame and a previous frame, is generated and the extent of motion calculated based on the correlation, which can be corrupted by noise. Thus, even though interlaced-to-progressive scanning conversion is performed, a deteriorated picture may result due to the presence of noise.

To solve the aforementioned problems, an interlaced-to-progressive scanning converting method in which a median filter having no motion detecting capability but being capable of effectively preventing noise, has been proposed by Licia Capodiferro, Interlaced-to-progressive Conversion by Median-filtering, *Proceedings of the 3rd International Workshop on HDTV* (Torino, Italy, September 1989). Here, the median filter determines a median value between adjacent data, and thus, provides a simple hardware implementation of such a converter. However, such a converting method using a median filter results in a stepped-shaped edge phenomenon for contours in the picture, which is more apparent than with the method using motion-adaptive signal processing. Furthermore, if noise is mixed on the channel, the pixels corresponding to the noise components are used in the interpolation, resulting in a lower signal-to-noise ratio than in the case of the interlaced-to-progressive scanning converting method using linear interpolation.

Figure 2:
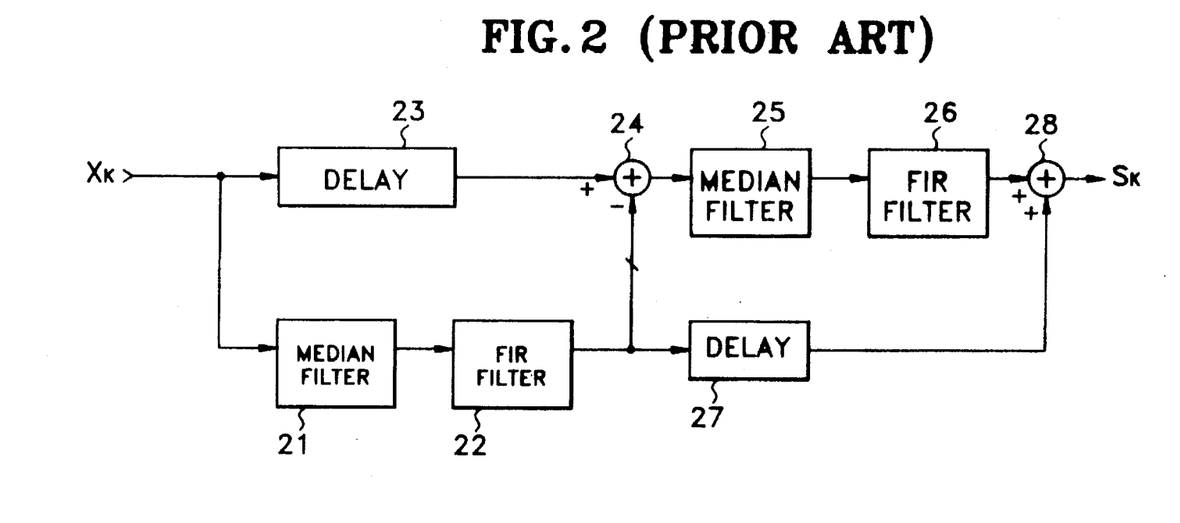
FIG. 2 is a block diagram of a conventional double-smoothing apparatus.

To compensate for such shortcomings, a finite impulse response (FIR) filter can be used together with the median filter for pre-processing the interlaced-to-progressive conversion. The FIR filter effectively eliminates the Gaussian noise, but does not effectively eliminate the impulse noise. On the other hand, the median filter effectively eliminates the impulse noise but not the Gaussian noise. Accordingly, as shown in FIG. 2, a double-smoothing method performed by a combination of a median filter and FIR filter has been proposed by L. R. Rabiner, M. R. Sambur and C. E. Schmidt, Applications of a Non-linear Smoothing Algorithm for Speech Processing, *IEEE Trans. on ASSP*, Vol. 23, pp. 552–557 (December 1975).

As shown in FIG. 2, the impulse noise and Gaussian noise components of the interlaced scanning signal $x_k$ are filtered by the median filter 21 and the FIR filter 22, respectively. The input signal $x_k$, is delayed in delay element 23 for a predetermined time, and subtracted from the filtered signal in a subtractor 24 to thereby obtain an error signal that corresponds to the noise components. The error signal is again filtered by median filter 25 and FIR filter 26. Thus, the resulting output signal from FIR filter 26 contains the signal extracted from the input noise components and, hence, provides a double-filtered source signal. This source signal and a source signal output from the FIR filter 22, which passes through delay element 27, are summed in an adder 28 to thereby obtain a final double-smoothed source signal $s_k$.

However, this interlaced-to-progressive scanning converter employing such a double-smoothing method in processing a picture signal, causes the picture signal to tend to be excessively repressed, and stepped-shaped edges still remain due to bias errors generated in the median filter that are produced from edge portions in the picture.

Further, an adaptive median filter system is disclosed in U.S. Pat. No. 4,682,230 wherein the relative density of an impulse noise component included in an input signal is detected. Here, a control signal corresponding to the detected noise density is generated, and a signal sampled is adaptively filtered according to the control signal.

SUMMARY OF THE INVENTION

Therefore, it is an object of the present invention to provide an interlaced-to-progressive scanning converting apparatus for double-smoothing input data by which Gaussian noise and impulse noise can be effectively eliminated while picture contours are maintained.

It is another object of the present invention to provide an interlaced-to-progressive scanning converting method having a double-smoothing function.

To accomplish the above objects, there is provided an interlaced-to-progressive scanning converting apparatus having a double-smoothing function according to the present invention wherein an interlaced scanning television signal is converted into a progressive scanning television signal, the apparatus comprising: means for median-filtering an input interlaced scanning signal; means for censoring a signal beyond a predetermined critical value by receiving the signal median-filtered by the median-filtering means; order statistics filtering (OSF) means for receiving the signal censored by the censoring means, setting a predetermined weighing coefficient thereto and outputting the result; means for generating a line delayed signal and an interpolation scanning line signal from the output signal of the OSF means; and means for generating a progressive scanning signal from the signal provided by the interpolation signal generating means.

Also, the interlaced-to-progressive scanning converting method having a double-smoothing function according to the present invention wherein an interlaced scanning television signal is converted into a progressive scanning television signal, comprises the steps of: median-filtering an input interlaced scanning signal; censoring a signal beyond a predetermined critical value by receiving the signal median-filtered by the median-filtering step; receiving the signal censored by the censoring step, setting a predetermined weighing coefficient thereto and outputting the result; generating a line delayed signal and an interpolation scanning line signal from the output signal of the setting step; and generating a progressive scanning signal from the signal generated by the interpolation signal generating step.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

The interlaced-to-progressive conversion according to the present invention is based on three-point vertical median-filtering in order to reduce inter-line flickering and line crawling generated due to the interlaced data. The three points are the interlaced data processed by a double-smoothing means. The double-smoothing means is based on an order statistics filtering (OSF) method performed by censoring, to eliminate impulse and/or non-impulse noise while maintaining signal edges.

Figure 3:
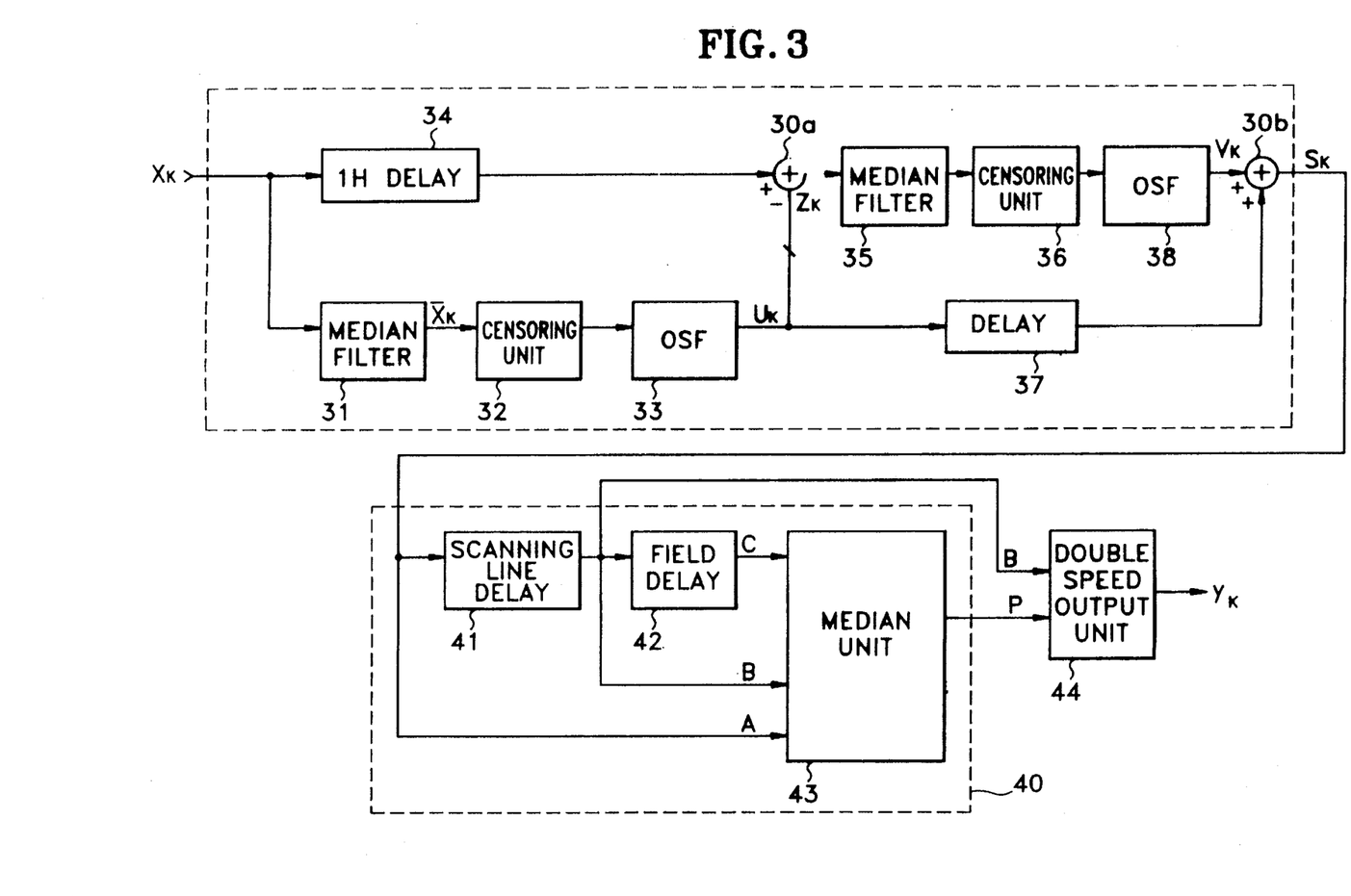
FIG. 3 is a block diagram of an embodiment of the interlaced-to-progressive converting apparatus for double-smoothing according to the present invention.

FIG. 3 is a block diagram of an embodiment of the interlaced-to-progressive converting apparatus having a double-smoothing means according to the present invention.

The embodiment of FIG. 3 is largely composed of two blocks. One block represents a double-smoother 30 for double smoothing the input interlaced scanning signal $x_k$ which also contains noise components. The other block represents an interlaced-to-progressive scanning converter 40 for converting the smoothed interlaced signal $s_k$.

In a double-smoother 30, since the signal is collapsed by impulse noise and linear filtering damages the signal edge, if the input contains a distinct edge component, then the median filter generates a bias error related to the noise power and the magnitude of the signal edge. Furthermore, since a median filter cannot smooth non-impulse noise as well as the linear filter, a double-smoothing method is adopted on the basis of the OSF accompanied by a means for censoring.

The output from the OSF $U_k$ is a linear combination of the order statistics of the censored data group. The censoring reference point is set as a median value of the points within a window. Thus, the OSF provides a compromise between a median filter and a motion average filter.

In an interlaced-to-progressive scanning converter 40, the input pixels for three-point vertical median-filtering are comprised of two pixels from a present field and one pixel from a previous field, or in other words, from the previous scan of the lines which interlace with the lines of the present field. The input pixels are disposed on adjacent lines but are located at the same horizontal position and hence, would appear along a vertical line if displayed by the interleaved scanning method. The three-point vertical median-filtering is an adaptive method that automatically switches between a motion-screen and a still-screen without complicated motion detection and edge detection, thereby reducing flickering.

First, a double smoother 30 is described below in detail.

The interlaced scanning signal $x_k$ including noise can be described as the sum of a source signal component $s_k$ and a noise component $n_k$ as follows.

$$x_k = s_k + n_k \qquad \ldots (1)$$

Figure 4:
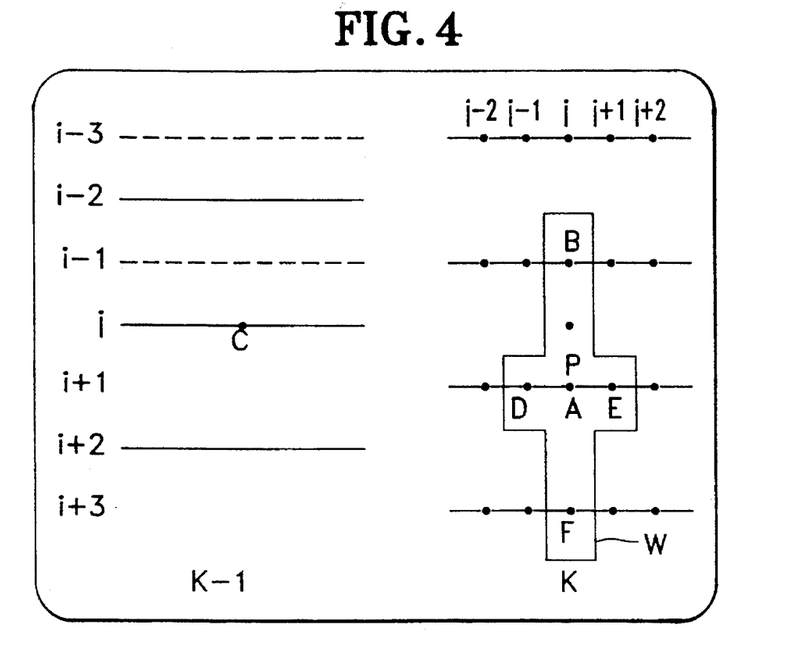
FIG. 4 depicts pixel points for illustrating median-filtering adopted for extracting space correlative information.

The interlaced scanning signal $x_k$ is median-filtered by median filter 31 using a window W, as shown in FIG. 4, thereby reducing the impulse noise component of $X_k$.

FIG. 4 shows a sample positional diagram used for extracting space correlative information, where i represents a vertical line number of, for example, a television picture, j represents a pixel number of line i, K represents a field number corresponding to the set of lines displayed on the same scan pass, and P represents an interpolated pixel.

Figure 5:
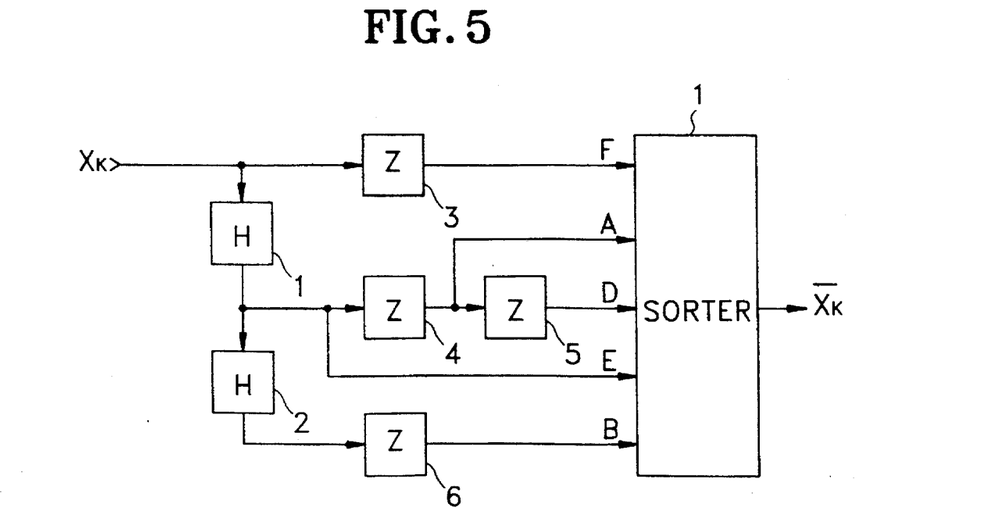
FIG. 5 is a detailed block diagram for describing the median filter shown in FIG. 3.

FIG. 5 shows a detailed block diagram of the median-filters 31 and 35 shown in FIG. 3. The median filters are composed of two scanning line delay elements 1 and 2, four sample delay elements 3 to 6, and a five pixel sorter 7. The median-filters perform five-pixel median-filtering as shown in FIG. 4.

Referring to FIG. 5, the interlaced scanning signal $x_k$ is delayed for the period of one sample by delay element 3 and is output to sorter 7 as a sample F. The interlaced scanning signal $x_k$ is delayed by the scanning line delay element 1 for the period of one line, and output to sorter 7 as a sample E. $X_k$ is further delayed by delay elements 4 and 5 for the period of two samples, thereby being output to sorter 7 as a sample D. The output signal of sample delay element 4 is applied to sorter 7 as a sample A. Also, the output signal of scanning line delay element 1 is further delayed by scanning line delay element 2 for another one line period, then passes through the sample delay element 6 to thereby be delayed for a period of one sample, and is then output to sorter 7 as a sample B.

In FIG. 4, five pixels A, B, D, E and F being located within the window W of the present field K are supplied simultaneously to sorter 7 by scanning line delay elements 1 and 2 and sample delay elements 3, 4, 5 and 6. Then, sorter 7 sorts the input samples according to data amplitude, and outputs the median value $\overline{x_k}$.

A median filter, such as median filter 31 of FIG. 3, effectively filters impulse noise but, cannot filter non-impulse noise as effectively as a linear filter. Therefore, the median-filtered signal is applied to a smoothing filter comprising a combination of a censoring unit 32 and OSF 33. The output signal $\overline{x_k}$ of median filter 31 becomes a reference point for censoring the input data in censoring unit 32, and must not be an outlying sample. Furthermore, a critical value c is determined, which defines a range around the reference point outside of which data is censored. The value of $\overline{x_k} + 3\sigma$ is used as the bias value of the censored data.

Thus, the censored data $x_j$ is an element of Lc, i.e., $x_j \in Lc$, $$Lc = \{x_j | \overline{x_k} - c \leq x_j \leq \overline{x_k} + c\} \qquad \ldots (2)$$

where c equals min $\{3\sigma, h/2\}$ and $\sigma$ represents the standard deviation of the noise distribution. $3\sigma$ is experimentally determined according to channel characteristics, and can also be set to any other value.

In order to prevent an edge portion from being included in such a bias value and smoothing process, the censoring process can take another critical value h/2. Where h represents edge height expressed as a difference in levels between edges. Selecting h/2 as the critical value prevents the situation in which samples belonging to other edge levels are used for censoring.

Gaussian non-impulse noise components fall mainly within $3\sigma$. Here, if h/2 value is less than $3\sigma$, then the h/2 value is selected as a critical value, and if $3\sigma$ is less than h/2, then $3\sigma$ is selected as a critical value. Also, in the event that separate means for calculating $\sigma$ are not provided, the h value can be set at the discretion of a system designer, e.g., to 30.

The signal censored as set forth above, is supplied to OSF 33. An embodiment of the OSF means can be found in Alan C. Vovik, Thomas S. Huang and David C. Munson, A Generalization of Median-filtering using Linear Combinations of Order Statistics, *IEEE Trans. on Acoustics, Speech and Signal Processing*, Vol. 31, No. 6, pp. 1342–1350 (Dec. 1983).

OSF 33 is a filter for mainly eliminating Gaussian noise, and the output thereof is determined according to the following formula.

$$u_k = \sum_k \alpha_i x_i \qquad (3)$$

where $x_i$ is less than or equal to $x_j$ given that i is less than or equal to j, and $\alpha_i$ is a weighing coefficient.

In this manner, the OSF aligns the censored pixel data in the order of amplitude, smoothes out the noise components remaining after median-filtering, and removes the stepped edge generated by the interlaced-to-progressive conversion, by setting a predetermined weighing coefficient with respect to each pixel data.

The function performed by the OSF is determined by the weighing coefficients $\alpha_i$, as follows. If the weighing coefficients $\alpha_i$ of the OSF are all "1's," the OSF produces a median value. If only the pixel data corresponding to the median value are weighted by a weighing coefficient of "1," the OSF operates as a median-filter. If only the largest pixel data is weighted as "1," the OSF becomes a maximum filter. If only the smallest pixel data is weighted as "1," the OSF becomes a minimum filter. If the weighing coefficient $\alpha_i$ is set differently for each pixel data, the OSF becomes a linear low-pass filter.

The combination of the aforementioned filters can be embodied in OSF 33 according to the output of censoring unit 32. For example, in the case of a five-point window, as shown in FIG. 4, if four or five points are censored, the weighing coefficients are set as "1" and their mean value is obtained. If three are censored, the weighing coefficients are set as ¼, ½ and ¼, respectively, to then be filtered. If one or two are censored, the reference value, i.e., the median value is passed without being changed. Moreover, OSF 33 can be replaced by a linear-weighted order statistics filter (LWOS filter) or a linear combination of weighted order statistics filter (LCWOS filter), each of which are similar to OSF 33 in characteristics.

Since smoothing based only on order statistics filtering preceded by censoring is undesirable, double-smoothing is performed.

The signal $u_k$ output from OSF 33 is subtracted from the original interlaced scanning signal $x_k$ delayed in a delay element 34 to synchronize with $U_k$, by a subtractor 30a. Subtractor 30 produces an error signal that can be expressed by equation (5), set forth below. That is, since the noise in $x_k$ has been removed, $$u_k = s_k \qquad \ldots (4)$$

thus, $$z_k = x_k - u_k = n_k \qquad \ldots (5)$$

Where $s_k$ and $n_k$ are estimates for signal and noise, respectively, hence, $z_k$ is the error signal corresponding to the noise component.

When the error signal $z_k$ passes through a median filter 35, censoring unit 36 and OSF 37, a residual signal component is detected from the signal $z_k$ from which the source signal components had previously been removed. Thus, the detected signal $v_k$ is double-smoothed, and then summed in an adder 30b, with the once-smoothed signal $u_k$ delayed by a delay element 37 for a predetermined time, thereby finally producing a double-smoothed signal $s_k$. That is, $$w_k = v_k + u_k = s_k \quad \ldots (6)$$

Next, the operation of the interlaced-to-progressive converter 40 for three-point vertical median-filtering will be described with reference to FIG. 4.

The pixel points A, B and C shown in FIG. 4 are double-smoothed data. The points A, B and C are used in the interlaced-to-progressive scanning conversion mode, where A and B are pixels on adjacent lines in one interlaced scan field, and C is a pixel on a line in another interlaced scan field that is interlaced between the lines containing A and B. In this manner, the double-smoothed interlaced scanning signal $s_k$ obtains pixel values A, B and C shown in FIG. 4 by means of scanning line delay element 41 and field delay element 42, and the pixel value P to be interpolated is determined as their median value. That is, $$P = \text{med}\{A, B, C\}$$

Since the interpolation using the median value has a high spatial correlation in the case of a moving picture, either of pixels A and B have a high probability to be selected. Moreover, pixel C is also liable to be selected in the case of a still picture. Therefore, interpolation is selectively performed according to whether or not the picture contains areas of motion.

The pixels A, B and C are all double-smoothed data output from the double-smoother 30. The pixel data P to be interpolated is selected by a median unit 43 which is a three-pixel sorter. Thereafter, a double speed output unit 44 scans the double-smoothed pixel B and the interpolated pixel P at a rate twice the scanning speed of the interlaced scanning rate. The double speed output unit 44 thereby outputs a picture signal $y_k$ according to a progressive scanning method.

Figure 6:
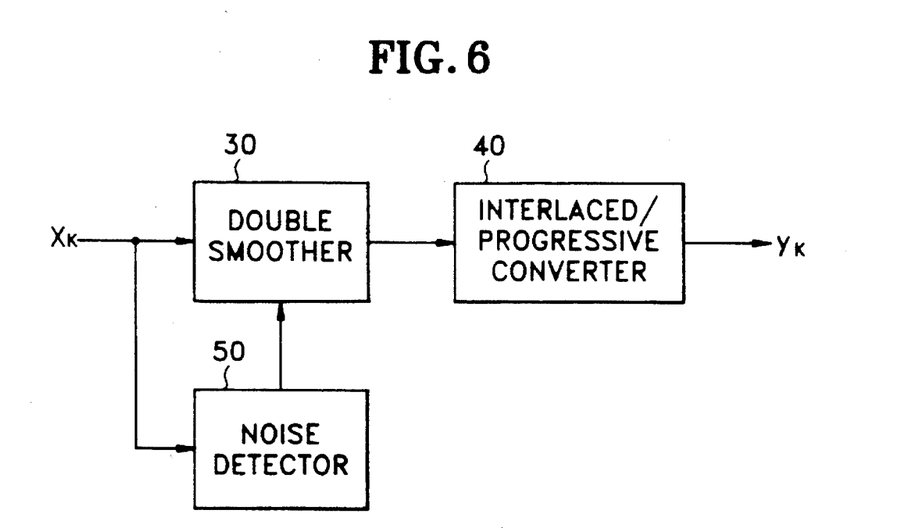
FIG. 6 is a schematic block diagram of another embodiment of the interlaced-to-progressive converting apparatus for double-smoothing according to the present invention.

FIG. 6 is a schematic block diagram of the interlaced-to-progressive scanning converting apparatus for double-smoothing according to another embodiment of the present invention.

Referring to the embodiment of FIG. 6, the interlaced-to-progressive scanning converting apparatus comprises a double-smoother 30 and an interlaced/progressive converter 40, which correspond to those shown in FIG. 3, and further includes a noise detector 50. The noise detector 50 measures noise from the input interlaced scanning signal $x_k$, and thereby obtains the standard deviation $\sigma$ of the noise and supplies the value $\sigma$ to the censoring units 32 and 36 of the double smoother 30.

The double smoother 30 adaptively varies the critical value for censoring by the value $\sigma$ variable according to the extent of the noise of the input signal $x_k$, set forth below in detail.

In equation (2) described above, simulation results show that small changes in h do not substantively affect the performance. Therefore, it is possible to set the value h as a fixed value to simplify manufacturing. Also, since the area beyond $3\sigma$ is statistically regarded as an abnormal state, where $\sigma$ is the standard deviation of the noise component, the basis of censoring is set as $3\sigma$. Here, $\sigma$ corresponds exactly to the Gaussian noise and is expressed in the following equation (7).

$$\sigma = \sqrt{1/n \Sigma (x - \mu)^2} \quad (7)$$

Here, since x represents an input signal and $\mu$ represents a mean value, it is much easier to calculate the value $\sigma$ in a portion of the signal with a constant level, or flat area. For example, it is possible to determine the variation in the portion of the received signal without a signal component such as in a vertical blanking period. In other words, the calculation of equation (7), which involves finding the square root of a squared value, is complicated. More simply, the noise state can be estimated from the sum over a given period of the flat area, and the value of the equation can be replaced by $\sigma$, as set forth below.

Assuming that the level of the flat portion is zero, it is possible to evaluate the noise amount quantitatively by an absolute value sum. If the noise amount (absolute value sum) is large, $\sigma$ is set to be large, and vice versa. Strictly speaking, since $\sigma$ provides a basis for evaluation for the Gaussian noise, in order to demonstrate fully the characteristics of the present invention, it is desirable to calculate $\sigma$ after the impulse noise is eliminated.

Figure 7:
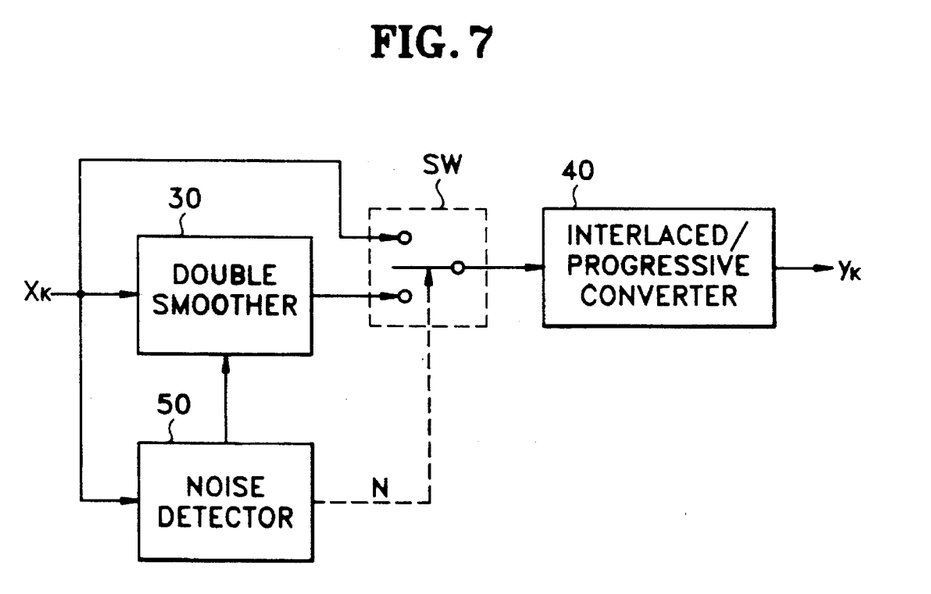
FIG. 7 is a schematic block diagram of still another embodiment of the interlaced-to-progressive converting apparatus for double-smoothing according to the present invention.

FIG. 7 is a schematic block diagram of the interlaced-to-progressive scanning converting apparatus having a double-smoothing function according to still another embodiment of the present invention. When compared with the device shown FIG. 6, the apparatus further includes a switch SW whose first input terminal is connected with the input terminal to which an interlaced-to-progressive signal is input, whose second input terminal is connected with the output of the double smoother 30, and whose output is connected with the input of the interlaced-to-progressive converter 40.

As shown in FIG. 7, the switch SW selects either the input signal $x_k$ or double-smoothed output signal, and supplies the selected signal to the interlaced-to-progressive converter 40. The switching operation of the switch SW is controlled according to the extent of the noise N detected by noise detector 50. That is to say, if there is no noise in the input signal $x_k$, the double-smoothing with respect to the input signal is omitted and only the interlaced-to-progressive conversion is performed. If noise is present in the input signal $x_k$, then the input signal $x_k$ is double-smoothed in the double smoother 30, and then the interlaced-to-progressive conversion is performed.

The interlaced-to-progressive scanning converting apparatus according to the present invention is adopted for image apparatuses such as televisions, facsimiles or medical appliances.

As described above, the interlaced-to-progressive scanning converting apparatus for double-smoothing, and the method therefor, according to the present invention can eliminate impulse noise and Gaussian noise effectively and can prevent the occurrence of a stepped-shaped edge phenomenon generated in an interlaced-to-progressive conversion. The apparatus and method operate by performing double-smoothing composed of median-filtering, censoring and order statistics filtering with respect to an interlaced scanning signal and then converting it into a progressive scanning signal.

What is claimed is:

1. An interlaced-to-progressive scanning converting apparatus for double-smoothing, wherein an interlaced scanning television signal is converted into a progressive scanning television signal, said apparatus comprising:

means for median-filtering an input interlaced scanning signal;

means for censoring a signal beyond a predetermined bias value by receiving the signal median-filtered by said median-filtering means;

order statistics filtering (OSF) means for receiving the censored signal, setting weighing coefficients according to the received signal, filtering the censored signal, and outputting the result;

interpolation signal generating means for generating a line delayed signal and interpolation scanning line signal from the output signal of said OSF means; and means for generating a progressive scanning signal from the signals generated by said interpolation signal generating means.

2. An interlaced-to-progressive scanning converting apparatus for double-smoothing, as claimed in claim 1, said apparatus further comprising:

first delay means for delaying said input interlaced scanning signal for a predetermined time;

subtracting means for subtracting the output signal of said OSF means from the output signal of said first delay means and then outputting an error signal;

means for double-smoothing the output signal from said subtracting means;

second delay means for delaying the output signal of said OSF means for a predetermined time; and means for adding said double-smoothed signal to the output signal of said second delay means and then supplying the sum to said interpolation signal generating means.

3. An interlaced-to-progressive scanning converting apparatus for double-smoothing, as claimed in claim 1, wherein said bias value for censoring is determined by adding a reference value to a critical value.

4. An interlaced-to-progressive scanning converting apparatus for double-smoothing, as claimed in claim 3, wherein the bias value is determined according to the median-filtered signal.

5. An interlaced-to-progressive scanning converting apparatus for double-smoothing, as claimed in claim 3, wherein the critical value is based on one of a standard deviation ($\sigma$) of the noise mixed with said output signal of said median-filtering means, and a level difference (h) at an edge in the input data.

6. An interlaced-to-progressive scanning converting apparatus for double-smoothing, as claimed in claim 5, wherein the critical value is based on one a minimum of $\sigma$ and h.

7. An interlaced-to-progressive scanning converting apparatus for double-smoothing, as claimed in claim 2, wherein said double smoother comprises:

means for median-filtering the output signal from said subtracting means;

means for censoring the signal median-filtered by said median-filtering means; and means for order-statistics-filtering the signal censored by said censoring means.

8. An interlaced-to-progressive scanning converting apparatus for double-smoothing, as claimed in claim 1, said apparatus further comprising noise detecting means for receiving said input interlaced scanning signal and thereby detecting an extent of noise included in the input signal and then supplying said censoring means with a standard deviation ($\sigma$) of the noise varied according to the extent thereof.

9. An interlaced-to-progressive scanning converting apparatus for double-smoothing, as claimed in claim 8, said apparatus further comprising switching means for performing a switching operation according to the extent of the noise detected by said noise detecting means, wherein said interlaced scanning signal is applied to a first input terminal, the output signal of said OSF means is applied to a second input terminal, and an output terminal is connected to said interpolation signal generating means.

10. An interlaced-to-progressive scanning converting apparatus for double-smoothing, as claimed in claim 1, wherein said OSF means sets the weighing coefficients to a constant value and outputs a mean value if pixel data of an input censored signal is greater than or equal to a first predetermined number, outputs a median value if pixel data of an input censored signal is less than or equal to a second predetermined number, and sets a plurality of weighing coefficients so as to output a linear filtered signal if the number of pixel data of an input censored signal is between said first and second predetermined numbers.

11. An interlaced-to-progressive scanning converting apparatus for double-smoothing, as claimed in claim 1, wherein said interpolation signal generating means comprises:

scanning line delay means for delaying the output signal of said OSF means by one scanning line period;

field delay means for delaying the output signal of said scanning line delay means by one field period; and median means for receiving each output signal of said OSF means, scanning line delay means and field delay means, and thereby outputs a mean value thereof.

12. An interlaced-to-progressive scanning converting apparatus for double-smoothing, as claimed in claim 11, wherein said progressive scanning signal generating means receives each output signal of said scanning line delay means and median means and then alternatively outputs the two input signals at twice the speed of the input signals.

13. An interlaced-to-progressive scanning converting apparatus for double-smoothing, said apparatus comprising:

first filtering means for median-filtering an input interlaced scanning video signal, applying a weighing coefficient according to the degree to which the filtered signal exceeds a predetermined bias value and outputting the result;

delaying and subtracting means for delaying said interlaced scanning video signal and thereby subtracting the output signal of said first filtering means from the delayed signal;

second filtering means for median-filtering the output signal of said delaying and subtracting means, applying a weighing coefficient according to the degree to which the filtered signal exceeds a predetermined bias value and thereby outputting the result;

delaying and adding means for delaying the output signal of said first filtering means and adding the delayed signal to the output signal of said second filtering means;

interpolation signal generating means for generating a line delayed signal and an interpolation scanning line signal from the output signal of said delaying and adding means; and means for generating a progressive scanning signal from the signal generated from said interpolation signal generating means.

14. An interlaced-to-progressive scanning converting apparatus for double-smoothing, as claimed in claim 13, said apparatus further comprising noise detecting means for receiving said input interlaced scanning signal and thereby detecting the extent of noise included in the input signal and then supplying a standard deviation (σ) of the noise, varied according to the extent thereof to said first and second filtering means.

15. An interlaced-to-progressive scanning converting apparatus for double-smoothing, as claimed in claim 14, said apparatus further comprising switching means for performing a switching operation according to the extent of the noise detected by said noise detecting means, wherein said interlaced scanning signal is applied to a first input terminal, the output signal of said delay and adding means is applied to a second input terminal, and an output terminal is connected to said interpolation signal generating means.

16. An interlaced-to-progressive scanning converting apparatus, for converting an interlaced scanning signal into a progressive scanning signal, said apparatus comprising:

means for double-smoothing an interlaced scanning signal and eliminating Gaussian and impulse noise;

means for converting the double-smoothed interlaced scanning signal into a progressive scanning signal.

17. An interlaced-to-progressive scanning converting apparatus, for converting an interlaced scanning signal into a progressive scanning signal, as claimed in claim 16, wherein said means for converting further comprises:

interpolation means for generating an interpolated signal based on the interlaced scanning signal; and double speed output means for alternatively selecting the double smoothed interlaced signal and the interpolated signal to generate a progressive scanning signal.

18. An interlaced-to-progressive scanning converting apparatus, for converting an interlaced scanning signal into a progressive scanning signal, as claimed in claim 17, wherein said means for double-smoothing comprises;

first filtering means for median-filtering the interlaced scanning video signal, applying a weighing coefficient according to the degree to which the filtered signal exceeds a predetermined bias value and outputting the result;

delaying and subtracting means for delaying said interlaced scanning video signal and thereby subtracting the output signal of said first filtering means from the delayed signal;

second filtering means for median-filtering the output signal of said delaying and subtracting means, applying a weighing coefficient according to the degree to which the filtered signal exceeds a predetermined bias value and thereby outputting the result;

delaying and adding means for delaying the output signal of said first filtering means and adding the delayed signal to the output signal of said second filtering means, thus producing a double-smoothed signal.

19. An interlaced-to-progressive scanning converting method having a double-smoothing function, wherein an interlaced scanning television signal is converted into a progressive scanning television signal, the method comprising the steps of:

double-smoothing an input interlaced signal thereby producing a double-smoothed signal thereby eliminating Gaussian and impulse noise, and preventing irregularly shaped edges, and;

interpolating a scanning line signal from the double-smoothed signal; and producing a progressive scanning signal from the double-smoothed signal and the interpolated scanning signal.

20. An interlaced-to-progressive scanning converting method having a double-smoothing function, wherein an interlaced scanning television signal is converted into a progressive scanning television signal, the method comprising the steps of:

median-filtering an input interlaced scanning signal (a median-filtering step);

censoring a signal beyond a predetermined bias value by receiving the signal median-filtered by said median-filtering step (a censoring step);

receiving the signal censored by said censoring step, setting a predetermined weighing coefficient to the received signal and then outputting the result (an order-statistic-filtering (OSF) step);

generating a line delayed signal and an interpolation scanning line signal from the output signal of the OSF step (an interpolation signal generating step); and generating a progressive scanning signal from the signal generated by said interpolation signal generating step (a progressive scanning signal generating step).

21. An interlaced-to-progressive scanning converting method having a double-smoothing function, as claimed in claim 20, said method further comprising the steps of:

firstly delaying said input interlaced scanning signal for a predetermined time;

subtracting the output signal of said OSF step from the output signal of said first delaying step;

double-smoothing the output signal of said subtracting step;

secondly delaying the output signal of said OSF step for a predetermined time; and summing said double-smoothed signal and the output signal of said second delaying step and then supplying the resultant sum to said interpolation signal generating step.

22. An interlaced-to-progressive scanning converting method having a double-smoothing function, as claimed in claim 20, wherein said bias value is obtained by adding the output signal of said median-filtering step to a critical value.

23. An interlaced-to-progressive scanning converting method having a double-smoothing function, as claimed in claim 22, wherein said critical value is determined based on a minimum of a standard deviation (σ) of the noise mixed with said output signal, and a level difference (h) at an edge in the input data.

24. An interlaced-to-progressive scanning converting method having a double-smoothing function, as claimed in claim 21, wherein said double-smoothing step comprises the steps of:

median-filtering said output signal generated by said subtracting step;

censoring the signal median-filtered by said median-filtering step; and order statistics filtering (OSF) the signal censored by said censoring step.

25. An interlaced-to-progressive scanning converting method having a double-smoothing function, as claimed in claim 20, wherein said interpolation signal generating step comprises the steps of:

delaying the output signal of said OSF step by a predetermined scanning line period (a scanning line delaying step);

delaying the output signal of said scanning line delaying step by a predetermined field period (a field delaying step); and receiving each output signal of said OSF step, scanning line delaying step and field delaying step, and then calculating the median value thereof (a median step).

26. An interlaced-to-progressive scanning converting method having a double-smoothing function, as claimed in claim 20, said method further comprising a noise detecting step for receiving said input interlaced scanning signal and thereby detecting an extent of noise included in the input signal and then supplying a standard deviation value varied according to the extent thereof to said censoring step.

27. An interlaced-to-progressive scanning converting method having a double-smoothing function, as claimed in claim 26, said method further comprising a selecting step for selecting said interlaced scanning signal or the output signal of said OSF step according to the extent of the noise detected in said noise detecting step and thereby outputting the selected signal to said scanning line interpolating step.

28. An interlaced-to-progressive scanning converting method having a double-smoothing function, as claimed in claim 20, wherein, in said OSF step, a weighing coefficient is set as a constant value to thereby calculate the mean value if the pixel data of the input censored signal is greater than or equal to a first predetermined number, a median value is generated if the pixel data of the input censored signal is less than or equal to a second predetermined number, and a plurality of weighing coefficients are set so as to generate a linear-filtered signal if the pixel data of the input censored signal is between the first and second predetermined numbers.

29. An interlaced-to-progressive scanning converting method having a double-smoothing function, as claimed in claim 20, wherein, in said progressive scanning signal generating step, each output signal of said scanning line delaying step and median step is received, and thereby each received signal is alternatively output at a twice the speed of the input signal.

30. An interlaced-to-progressive scanning converting method having a double-smoothing function, said method comprising the steps of:

firstly median-filtering an input interlaced scanning video signal, applying a weighing coefficient according to the degree to which the filtered signal exceeds a predetermined bias value and outputting the result;

delaying said interlaced scanning video signal and thereby subtracting the output signal of said first filtering step from the delayed signal;

secondly median-filtering the output signal of said delaying and subtracting step, applying a weighing coefficient according to the degree to which the filtered signal exceeds a predetermined bias value and outputting the result;

delaying the output signal of said first filtering step and adding the delayed signal to the output signal of said second filtering step;

generating a line delayed signal and an interpolation scanning line signal from the output signal of said delaying and adding step; and generating a progressive scanning signal from the signal generated in said interpolation signal generating step.

31. An interlaced-to-progressive scanning converting method having a double-smoothing function, as claimed in claim 30, said method further comprising a noise detecting step for receiving said input interlaced scanning signal, detecting an extent of noise included in said input signal and supplying a standard deviation ($\sigma$) of the noise varied according to the extent thereof to said first and second filtering steps.

32. An interlaced-to-progressive scanning converting method having a double-smoothing function, as claimed in claim 31, said method further comprising a selecting step for selecting either of said interlaced scanning signal and the output signal of said delaying and adding step, according to the extent of the noise detected in said noise detecting step.

* * * * *